(12) United States Patent
Geyer et al.

(10) Patent No.: US 6,883,865 B2
(45) Date of Patent: Apr. 26, 2005

(54) BICYCLE SEAT ASSEMBLY

(76) Inventors: Thomas C. Geyer, 4024 Calvert St., Apt. 2, Washington, DC (US) 20007; James B. Geyer, 2303 Stockton Rd., Phoenix, MD (US) 21131

( * ) Notice: Subject to any disclaimer, the term of this patent is extended or adjusted under 35 U.S.C. 154(b) by 0 days.

(21) Appl. No.: 10/308,056

(22) Filed: Dec. 3, 2002

(65) Prior Publication Data

US 2003/0080594 A1 May 1, 2003

Related U.S. Application Data

(62) Division of application No. 09/639,330, filed on Aug. 16, 2000, now Pat. No. 6,488,334.

(51) Int. Cl.$^7$ .................................................. B60N 2/38
(52) U.S. Cl. .............................. 297/195.1; 297/215.16
(58) Field of Search .............................. 297/195.1, 202, 297/215.11, 215.13, 195.11, 215.16

(56) References Cited

U.S. PATENT DOCUMENTS

| | | | |
|---|---|---|---|
| 475,020 A | 5/1892 | Perry et al. | |
| 504,843 A | 9/1893 | Light | |
| 524,106 A | 8/1894 | Draper | |
| 584,984 A | 9/1897 | Byrnes | |
| 590,439 A | 9/1897 | McDonald | |
| 4,108,462 A | 8/1978 | Martin | |
| 4,141,587 A | 2/1979 | Holcomb | |
| 4,176,880 A | 12/1979 | Marchello | |
| 4,572,575 A | 2/1986 | Golden et al. | |
| 4,657,270 A | 4/1987 | Allen et al. | |
| 4,773,705 A | 9/1988 | Terranova | |
| 4,909,522 A | 3/1990 | Flanigan | |
| 4,919,378 A | 4/1990 | Iwasaki et al. | |
| 5,048,891 A | 9/1991 | Yach | |
| 5,297,846 A | 3/1994 | Rafter | |
| 5,513,895 A | 5/1996 | Olson et al. | |
| 5,887,943 A | 3/1999 | Lee | |
| D409,009 S | * 5/1999 | Toll et al. | ..................... D6/354 |
| 5,921,625 A | 7/1999 | Muser | |
| 5,938,278 A | * 8/1999 | Langevin | ............... 297/215.16 |
| 6,045,180 A | * 4/2000 | Clutton | ..................... 297/202 |
| 6,152,524 A | * 11/2000 | Cox | ........................... 297/201 |
| 6,322,143 B1 | 11/2001 | Kassai | |
| 6,402,235 B1 | * 6/2002 | Letendre | ................. 297/195.1 |
| D461,601 S | * 8/2002 | Baskin | ..................... D30/135 |
| D467,441 S | * 12/2002 | Cox | ........................... D6/354 |

* cited by examiner

Primary Examiner—Peter M. Cuomo
Assistant Examiner—Stephen Vu
(74) Attorney, Agent, or Firm—Richard C. Litman

(57) ABSTRACT

A bicycle seat and adjustable mount includes an arcuate rail extending generally upward and backward from a base mounted on a bicycle seat post, and a seat support slidably mounted on the rail and capable of being positioned at various positions along the rail. The seat support preferably carries a seat having a planar laterally elongated base with terminal upstanding hip restraints to position the rider on the seat.

4 Claims, 11 Drawing Sheets

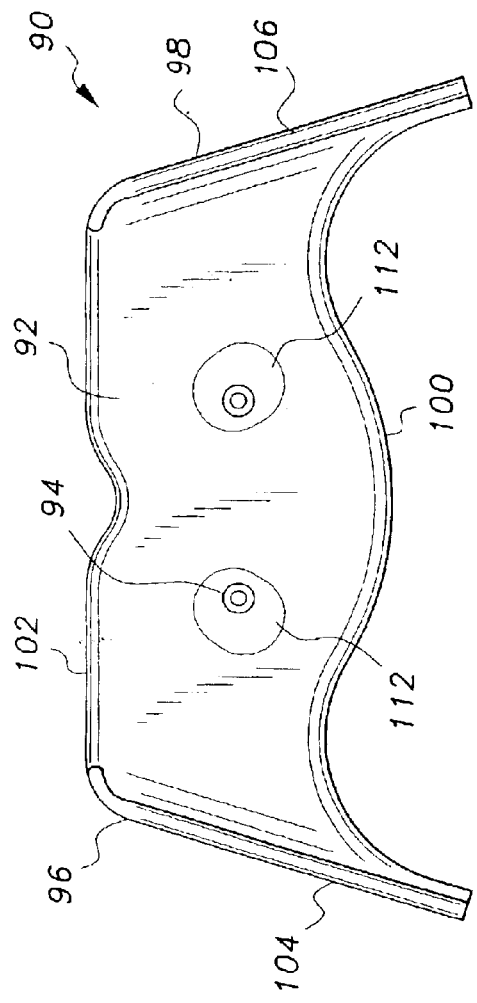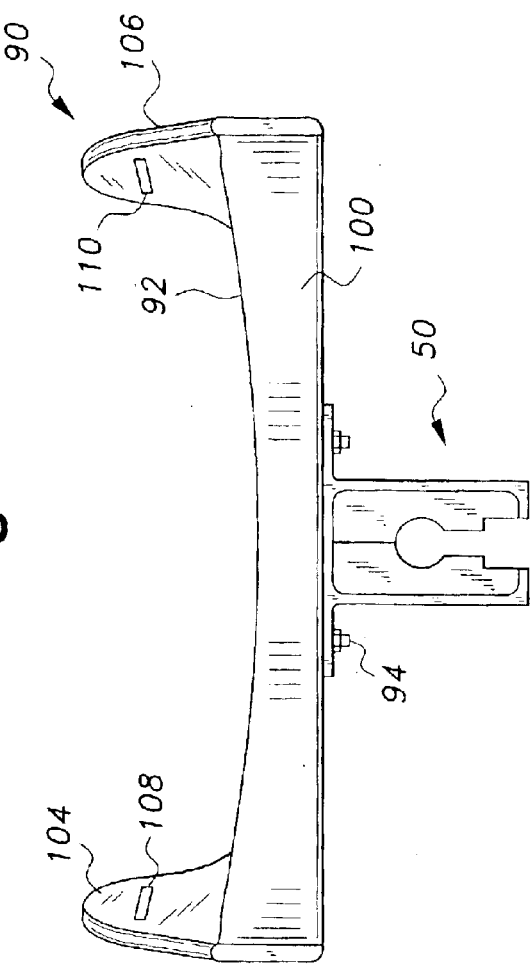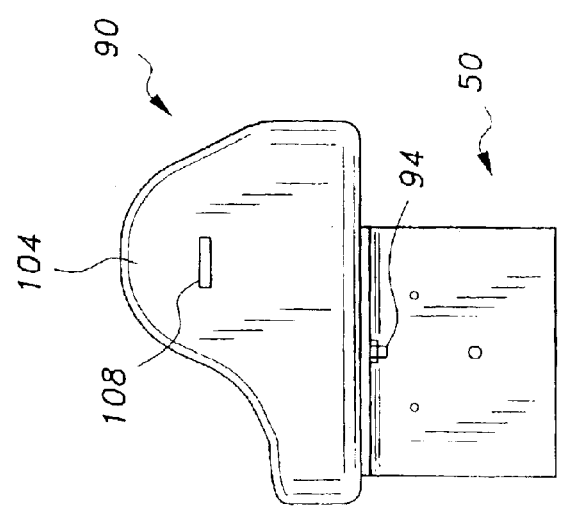

BICYCLE SEAT ASSEMBLY

This application is a divisional of U.S. application Ser. No. 09/639,330, filed Aug. 16, 2000, now U.S. Pat. No. 6,488,334 issued on Dec. 3, 2002.

FIELD OF THE INVENTION

This invention relates to seat assemblies for bicycles. More particularly, this invention relates to seat assemblies allowing for adjustment in angle, height and longitudinal position of the seat without the rider having to dismount from the bicycle.

BACKGROUND OF THE INVENTION

The seat of a bicycle is required to perform a number of functions for the rider. It must support the rider comfortably for rides of long duration, it must position the rider for maximum efficiency in pedaling the bicycle, and it must aid the rider in controlling and stabilizing the bicycle. Various seat configurations have been devised to attempt to meet these objectives simultaneously. Because a rider may assume different positions with respect to the pedals of the bicycle in order to achieve maximum power for different conditions, e.g., uphill versus level riding, various adjustable seat mountings also have been devised.

Most bicycle seats are elongated in a longitudinal direction with respect to the bicycle frame, and typically have transverse extensions with a forward-extending pommel to conform to the rider's anatomy and to aid in stabilizing and controlling the bicycle. This configuration of the seat, having a convex transverse cross-section, concentrates the force of the seat under the rider's ischial tuberosities and becomes uncomfortable, especially for rides of long duration. Furthermore, in recent years evidence has been accumulating that in some cases the pommel of the seat pressing on this perineal area can cause injury. Various seats without pommels have been devised, but control has been sacrificed by not having the pommel to straddle.

Preferably, the seat should be configured with a concave transverse cross-section to distribute the force of the seat over the rider's buttocks, and the seat should have elevated sides to provide the control lost by eliminating the pommel. Also, as the rider moves his body for optimal positioning, the seat should move along the same path to remain in contact with the rider to assure constant control, and the front of the seat should tilt downward to permit longitudinal pressing against the seat to counter forward thrust on the pedals, thereby increasing the thrust on the pedals to provide for maximum effort by the legs in turning the crank and to provide for maximum utilization of the rider's weight. At other times the rider wishes to have the seat in a lower, backward position and bends forward to minimize wind resistance.

Since adjustments to most seats require dismounting from the bicycle, the seat remains stationary with respect to the bicycle frame while the rider is riding. Consequently, when the rider rises from the seat for greater power, he can no longer use the seat for stabilizing the bicycle—with considerable increase in effort, stabilization and control must now be achieved with his arms. Furthermore, when the rider stands up, any forward thrust on the pedals must be countered by pulling backward on the handlebars with his arms. (It should be noted that the only effort by the rider that contributes to forward movement of the bicycle is that which he can exert with his legs by applying force to the pedals, and any energy expended by his arms other than for steering is wasted energy.)

Preferably, the seat should snugly fit the rider by inward leaning flexible sides and/or by use of a constraining member such as a belt. The rider should then be able to unlock the seat remotely from one or more of its various constraining locks and move to a new orientation carrying the seat with him. When in the new desired attitude, the rider should be able to relock the seat in its new attitude.

Accordingly, a need has continued to exist for an adjustable, comfortable bicycle seat assembly that can aid the rider in providing maximum pedaling force, can provide the rider with continual control in various pedaling positions, and avoids the possible injury associated with a seat having a pommel. It also would be preferable for the rider to be able to perform all releasing and locking of the seat without removing his hands from the handlebars.

Accordingly, it is an object of the invention to provide a seat assembly for a bicycle.

A further object is to provide a bicycle seat that does not have a pommel.

A further object is to provide a bicycle seat having side supporting members.

A further object is to provide a bicycle seat having angled and/or inward tilting side support members capable of grasping the sides of the buttocks of the rider to maximize control and to facilitate moving the seat into a new attitude.

A further object is to provide a bicycle seat having support members together with a constraining member such as a belt to maximize control and to facilitate moving the seat into a new attitude.

A further object is to provide a bicycle seat assembly that can ride along a rail so that the seat assembly can be simultaneously adjusted in both longitudinal position and in height.

A further object is to provide a seat assembly that can follow an optimal path positioning and supporting a rider over a full range of riding conditions.

A further object is to provide a seat assembly that can be adjusted in tilt position while riding the bicycle.

A further object is to have remotely controllable lock/release control from the handlebars for the several degrees of freedom in regard to the attitude of the seat assembly.

A further object is to have independently and/or simultaneously releasable degrees of freedom in regard to the attitude of the seat assembly.

A further object is to provide a bicycle seat assembly which can be tilted in a vertical plane to provide buttock support as counter-thrust for forward thrust on the pedals.

A further object is to provide a bicycle seat assembly wherein a rail that supports a seat can be shifted forward and backward and tilted to provide optimum seat positioning.

A further object is to provide a secondary tilt mechanism between the seat and the seat mount that rides on the rail.

A further object is to minimize counter-productive arm effort in control of the bicycle and countering forward thrust on the pedals.

Other objects of the invention will become apparent from the description of the invention which follows.

SUMMARY OF THE INVENTION

The above described needs have now been met by various aspects of the present invention, including a seat assembly having a concave transverse support member together with upstanding side support members slidably mounted on a rail.

In one aspect, the present invention provides a seat with a concave transverse support member and upstanding side support members slidably mounted on a rail via a seat mounting assembly that may be securely positioned at a plurality of locations along the rail. Depending upon the shape of the rail, the seat mounting assembly may comprise a single bushing with a partially circular channel, or a bushing box containing multiple bushings allowing for sliding along differently curved regions of the rail. The seat assembly may be secured at locations along the rail by hand via a plunger assembly, or electromechanically via a solenoid.

In another aspect, the present invention provides a seat as above that may be tiltably mounted on the seat mounting assembly and secured at a plurality of tilt positions. The tilt of the seat may likewise be adjusted through use of a plunger assembly or a solenoid.

In another aspect, the present invention provides a seat as above that may be adjusted along a translation rail mounted over the frame of the bicycle. The translation rail may be maintained level through use of an adjustable support assembly, and the seat may be secured at different locations along the rail through use of a plunger assembly or a solenoid.

In another aspect, the present invention provides a seat as above that may be adjusted rotationally about a central member and secured at a plurality of locations about the member through use of a plunger assembly or a solenoid.

In another aspect, the present invention provides a seat with a transverse and concave support member with upstanding side members that have slots to receive a restraining member or inwardly deflecting regions to hold a rider's hips.

In another aspect, the present invention provides a substantially spherical bushing having a bore therethrough to permit sliding along a rail and an opening to permit securing about a keel, where the diameter of the bore varies to permit sliding along differently curved regions of the rail.

BRIEF DESCRIPTION OF THE DRAWINGS

FIG. 2 shows a top plan view of the seat of the invention.

FIG. 3 shows a side elevational view of the seat and one embodiment of the seat mounting assembly.

FIG. 4 is a front elevational view of the seat and seat mounting assembly.

DETAILED DESCRIPTION OF THE PREFERRED EMBODIMENTS

Figure 1A:
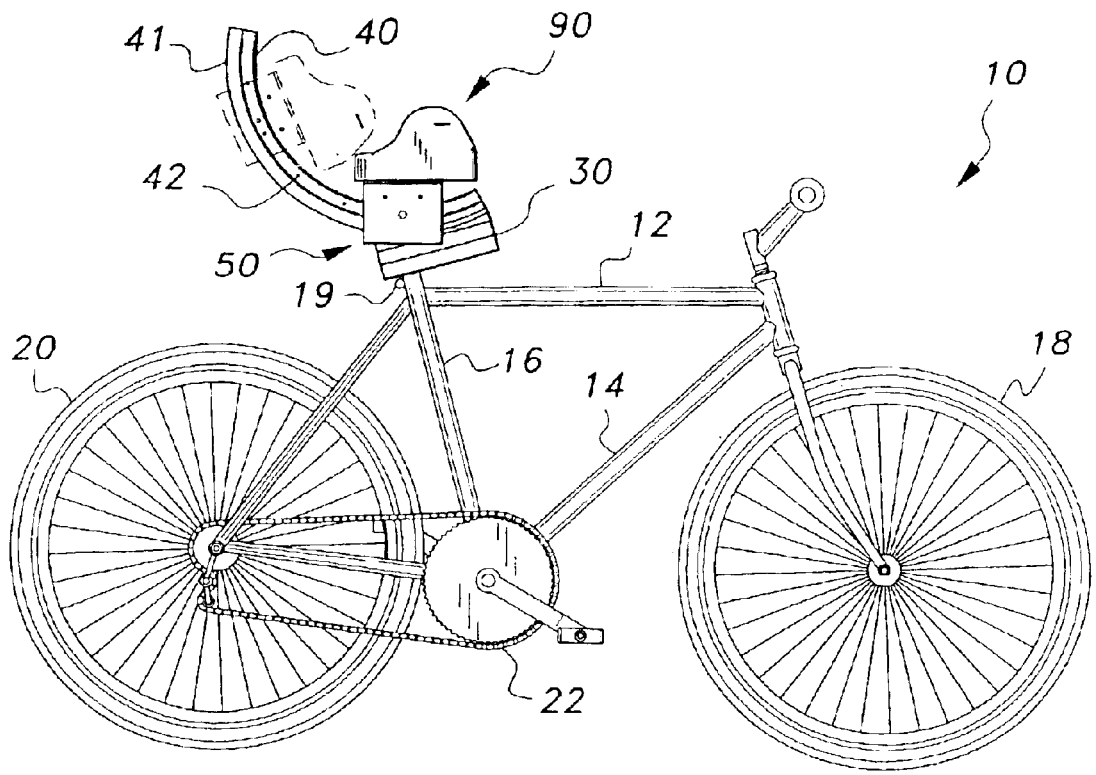
FIG. 1A shows a side elevational view of a bicycle equipped with a bicycle seat mounting of the invention positioned in a lowered position.

The invention will now be described with reference to the drawings, which illustrate preferred embodiments of the adjustable seat assembly of the invention and are not to be construed as limiting the scope of the invention.

Referring to FIGS. 1A and 1B, 6 and 7, bicycle 10 comprises a frame or top tube 12, a down tube 14, a seat tube 16, a front wheel 18, a rear wheel 20, and a chain drive mechanism 22. At least an upper portion of seat tube 16 is hollow and holds a shaft 17 (hidden), adjustable in height via a shaft adjustment member 19. Shaft 17 and shaft adjustment member 19 may comprise any arrangement commonly available. A keel base 30 is mounted on top of seat tube 16, or, if extended, shaft 17. For ease of discussion, reference to mounting the base 30 on seat tube 16 shall include shaft 17. Base 30 is generally rectangular in cross-section and may be mounted by any suitable means known in the art.

Extending rearwardly and upwardly from base 30 is arcuate rail 40 and keel 41. The rail may have a circular cross-section, such as cross-section 35 shown in FIG. 7, which is simplest to form and conducive to the easiest motion therealong. However, any cross-section, e.g., triangular, square, rectangular, polygonal or the like may be used. Rail 40 is integral with or attached to keel 41. Keel 41 inhibits left-to-right pivoting of the seat and mounting assembly during movement along the rail. Rail 40 has a plurality of rail detents 42. As will be explained, rail detents 42 enable seat mounting assembly 50 and seat 90 to be secured at a plurality of positions along rail 40.

Figure 1B:
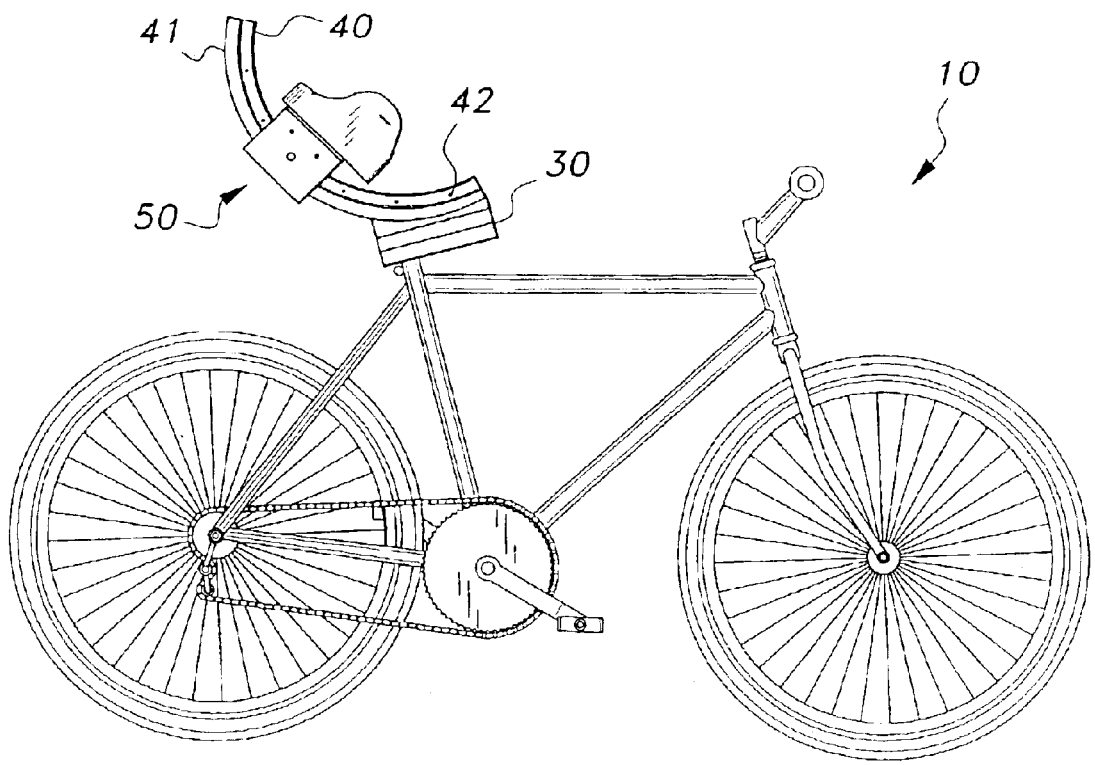
FIG. 1B shows a side elevational view of the bicycle of FIG. 1A with the seat in a somewhat raised position.
Figure 10:
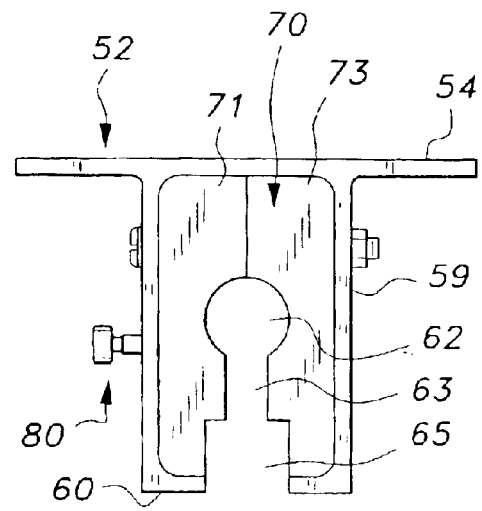
FIG. 10 is a front elevational view of the bushing box of FIG. 8, including a bushing therein.
Figure 11:
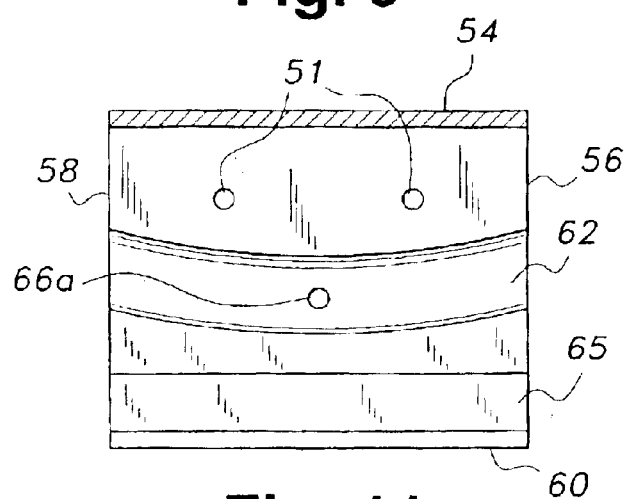
FIG. 11 is a cross-section of the bushing box of FIG. 8 and the bushing of FIG. 10 along the line 11—11.
Figure 12:
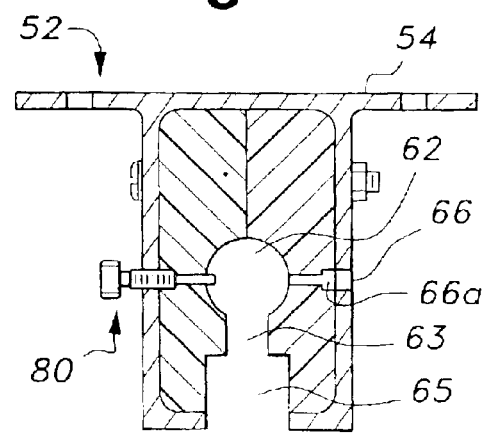
FIG. 12 is a cross-section of the bushing box of FIG. 8 and the bushing of FIG. 10 along the line 12—12.

The shape of the rail determines the position of the seat with respect to the normal position when it is displaced along the rail. In one embodiment, rail 40 may be a circular arc as shown in FIGS. 1A and 1B. As shown in FIGS. 10–12, a bushing 70 for positioning the seat 90 along such a circular rail 40 requires only a complementary arcuate channel 62 having a curvature matching that of rail 40, together with a neck portion to accommodate the keel. However, as shown for example in FIG. 14, the rail may have other curved shapes in order to position the seat 90 in other positions with respect to the normal position.

Accordingly, the rail may have an elliptical, parabolic, hyperbolic or compound curvature, and may even have a linear portion. For ease of discussion, any of these curvatures will be described by the term "arcuate." When a non-circular arcuate rail is used, as will be explained infra in connection with FIGS. 16–19, the mounting assembly will typically require a plurality of individual bushings 70' mounted within the assembly and capable of angular rotation to accommodate the varying angles required to fit the varying curvature of the rail.

Referring to FIGS. 2 through 5A, a seat 90 is secured to a seat mounting assembly 50, such as by one or more bolts 94. However, any means of securing the seat to the seat mounting assembly is suitable. For example, adhesive mounting, a dovetail clamp mounting, or the like could be used. The upper ends of the bolts 94 are preferably recessed into the surface 92 of the seat 90. Surface 92 extends generally transversely to frame 12 of bicycle 10 and preferably has a slightly concave form, as best shown in FIG. 4. A concave form with about a 40 inch radius is believed to be most advantageous.

Figure 5:
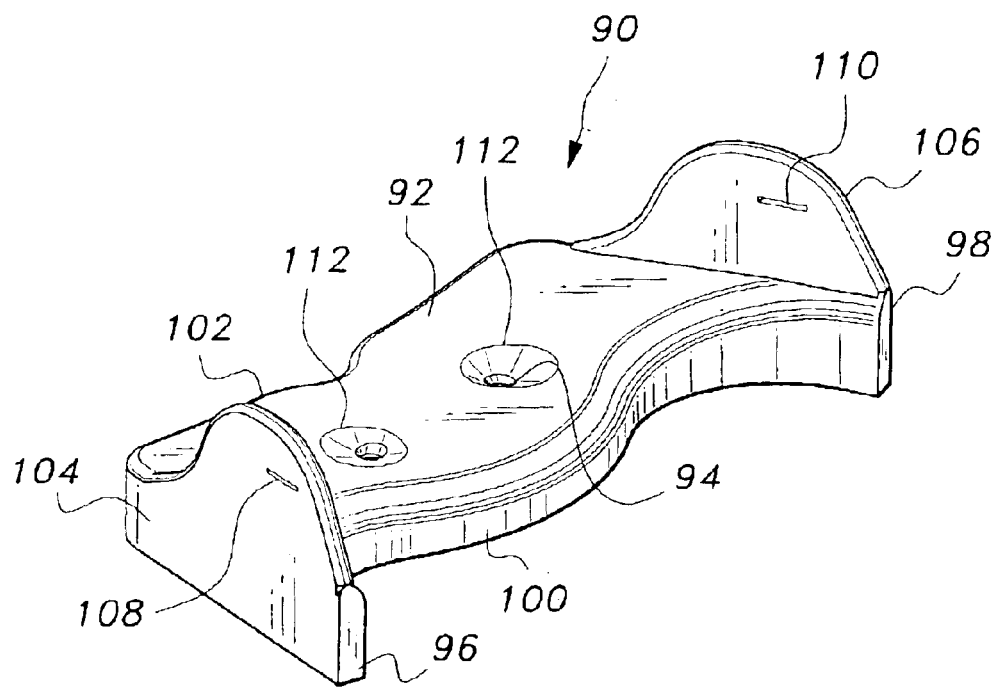
FIG. 5 is an isometric view of the seat.
Figure 6:
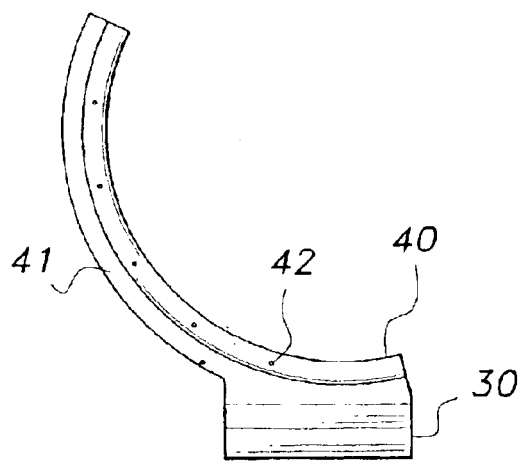
FIG. 6 is a side elevational view of a keel and arcuate rail assembly of one embodiment of the invention.
Figure 7:
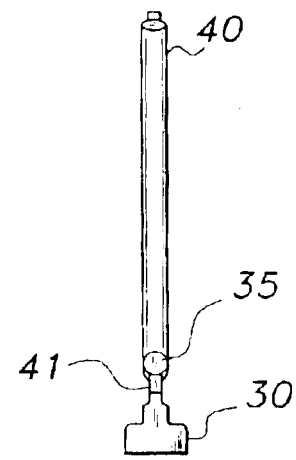
FIG. 7 is a front elevational view of the keel and arcuate rail assembly of FIG. 6.

From the rider's perspective, seat 90 has a right end 96, a left end 98, a front 100, and a rear 102. The surface 92 does not have a nose or pommel as is found in more conventional bicycle seats. Accordingly, this seat avoids the problem of injury caused by conventional seats. A right side 104 extends upwardly from right end 96, and a left side 106 extends upwardly from left end 98 to provide lateral support and location for the rider's hips. As shown in FIG. 5, right side 104 and left side 106 may preferably be angled to provide appropriate support. Also, slots 108 and 110 may be provided on right side 104 and left side 106, respectively, and a belt (not shown) may be employed through the slots so as to hold the rider more securely to seat 90. In addition, surface 92 of seat 90 may include two generally concave regions 112 to accommodate the rider's buttocks.

Figure 5A:
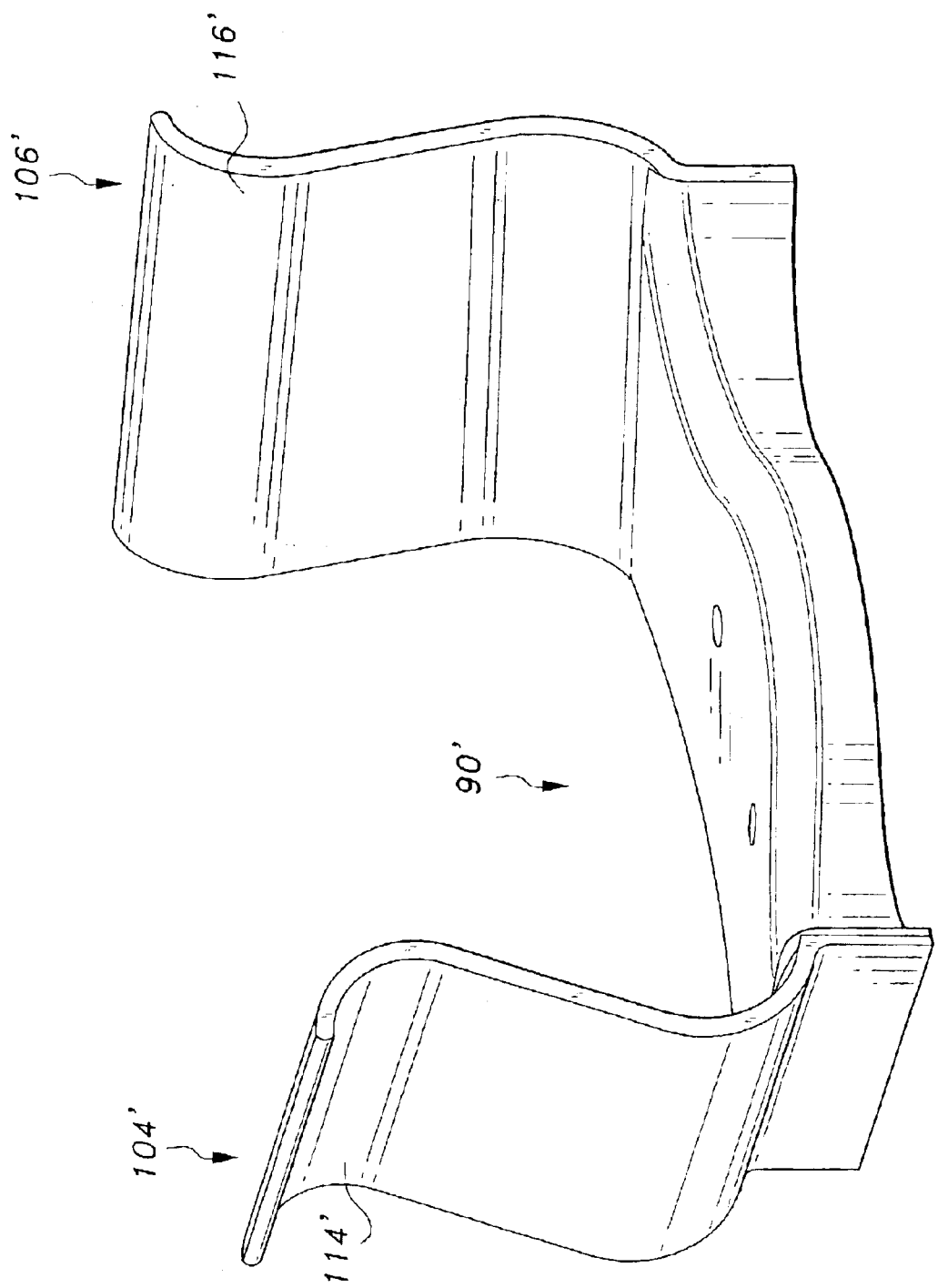
FIG. 5A is an isometric view of another embodiment of the seat.
Figure 8:
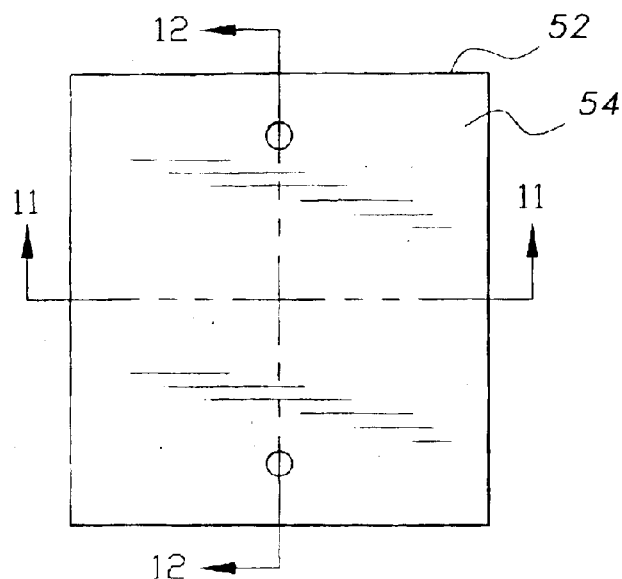
FIG. 8 is a top plan view of the bushing box of one embodiment of the invention.
Figure 9:
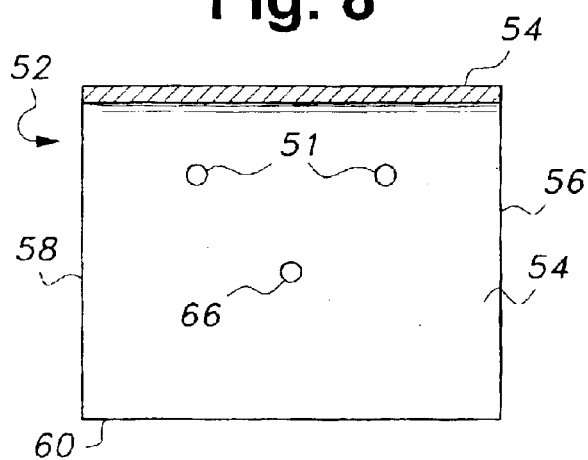
FIG. 9 is a side elevational view of the bushing box of FIG. 8.

A second embodiment of the seat is shown in FIG. 5A. In this embodiment, right and left sides 104' and 106' have inwardly deflected regions 114' and 116', respectively. These regions act to hold the rider's hips in place on the seat and reduce or avoid the need for a separate restraining member.

Two embodiments of seat mounting assembly 50 will now be explained in further detail. The first embodiment, shown in FIGS. 8–12, may be used with a circular rail, as in FIGS. 1A and 1B. In this embodiment, seat mounting assembly 50 comprises a generally hollow bushing box 52 having a top surface 54, a front 56, a rear 58, a bottom 60, a right side 57, and a left side 59. Within bushing box 52 and extending along its length from front to back is a single bushing 70, comprised of a right half 71 and a left half 73, which are fitted together over rail 40 and keel 41. When assembled, bushing 70 has a partially circular channel 62 shaped to slidably fit over the rail, including a neck portion 63 that rides along keel 41 and prevents left-to-right pivoting thereabout. Channel 62 also includes inlet 65, which is shaped to allow the seat mounting assembly to rest atop keel base 30. The left and right halves of bushing 70 also have holes (not shown) aligned with holes 51 on left and right sides of bushing box 52 to accept bolt-and-nut combinations 55 to fix bushing box 52 and bushing 70 about the rail. (Alternatively; depending on the particular construction of the rail, the bushing box and bushing might be mounted on the rail by sliding them over an end of the rail. In that case, the two-half construction of bushing 70 would not have to be used.)

Figure 14:
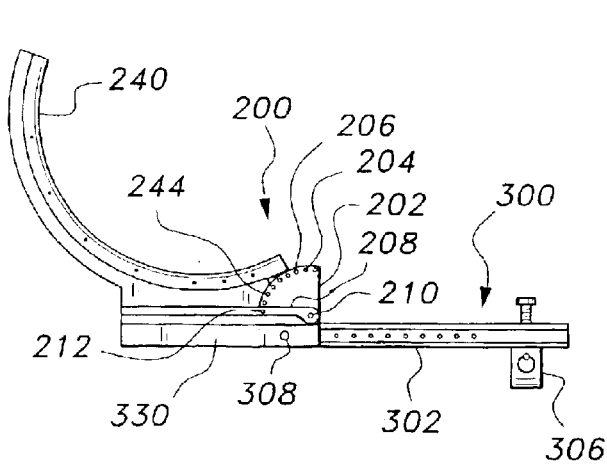
FIG. 14 is a side elevational view of a rotation assembly, translation assembly, and support assembly of the bicycle seat assembly of FIG. 13.

In the second embodiment shown in FIGS. 16–19, used with the rail of FIG. 14, mounting assembly 50' comprises a bushing box 52' having a top surface 54', a front 56', a rear 58', a bottom 60', a right side 57' and a left side 59'. Rather than being generally hollow, as in the first embodiment, bushing box 52' is generally solid, except for a channel 62' running along the bottom 60' of bushing box 52' from front 56' to rear 58'. The right side 57' of bushing box 52' may comprise a retaining cover attached to the left side by bolt assemblies 55' through holes 51'.

Figure 17:
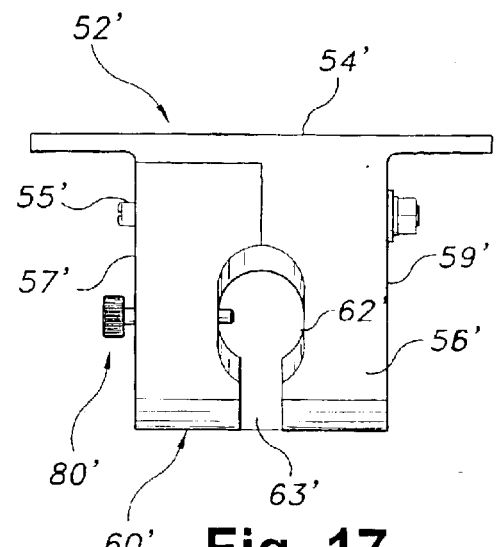
FIG. 17 is a front elevational view of the seat mounting assembly of FIG. 16.
Figure 18:
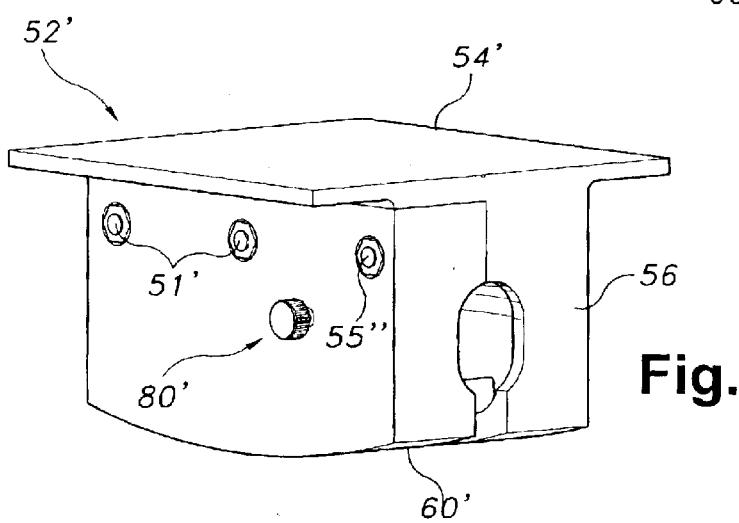
FIG. 18 is a perspective view of the seat mounting assembly of FIG. 16.
Figure 19:
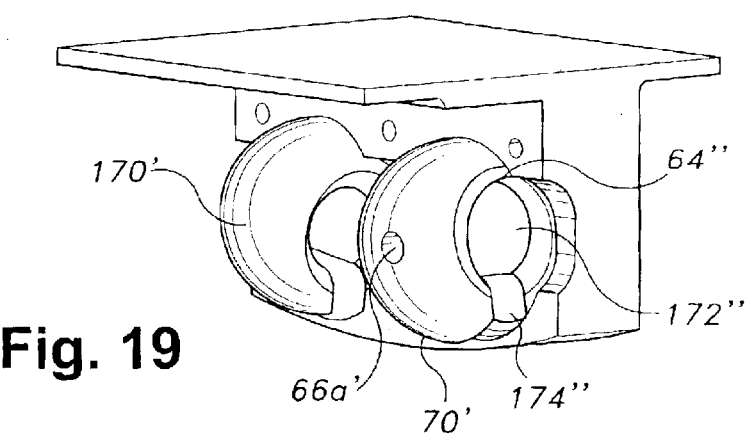
FIG. 19 is a cut-away view of a bushing box and bushings used with the seat mounting assembly of FIG. 16 with a retaining cover removed.

As shown in FIGS. 17–19, bushings 70' are located within cavities 64' in channel 62', which also includes neck 63'. These bushings may be made of any material that provides a smooth sliding fit on rail 40. Suitable materials include synthetic polymers such as teflon (polytetrafluoroethylene) and the like. A coventional bronze bushing material could also be used. As shown in FIG. 19, bushings 70' are of a spherical shape. That is, each bushing has a substantially spherical body 170' having a bore 172' therethrough along a diameter of the body. An opening 174', to be aligned with neck 63', is formed along a periphery of the body connecting to the bore. The bore and opening together allow the bushing 70' to slide along rail 40 and keel 41. The bore 172' should be larger in diameter at each of its ends than at the center of the bushing to accommodate regions of rail 40 of different curvatures. In mounting bushings 70' on rail 40 and keel 41, the bushings may be slid over the end of the rail, with bore 172' accommodating the rail, and opening 174' accommodating the keel. The bushing box 52' is then fitted over the bushings, and the bushings are then secured within bushing box 52' by means of mounting bolts 55'. Alternatively, the bushings may be split.

In either embodiment, the bushing box also includes a hole 66 (or 66') in right side 57 (or 57'). (See FIGS. 9, 16.) In the first embodiment, hole 66 is aligned with hole 66a in the right half 71 of bushing 70. (FIG. 12 actually shows a corresponding pair of holes 66 and 66a in the left side of the assembly for ease of visibility. Of course, holes can be provided on both sides so that the assembly may just as easily be used by a left-handed rider as a right-hander rider.) As shown in FIG. 19, in the second embodiment, hole 66a' is provided in one of the bushings 70' and extends from an outer surface of bushing 70' to the bore. When the bushing box 52' is placed around the bushings 70', hole 66a' in the one bushing will be aligned with hole 66' in the bushing box.

In either embodiment, a rail positioning member such as plunger assembly 80 is then threaded into hole 66 (or 66 ') and projects through hole 66a (or 66a') to arcuately secure mounting assembly 50 in one of various discrete positions along rail 40, as best shown in FIGS. 1A and 1B. Mounting assembly 50 (50') is thus secured along rail 40 as plunger assembly 80 is secured in one of rail detents 42. (Again, in the embodiment disclosed, the retaining member is provided on the right side of the seat mounting assembly for ease of access by a right-handed rider. Of course, a left-handed version may also be constructed.)

Figure 20:
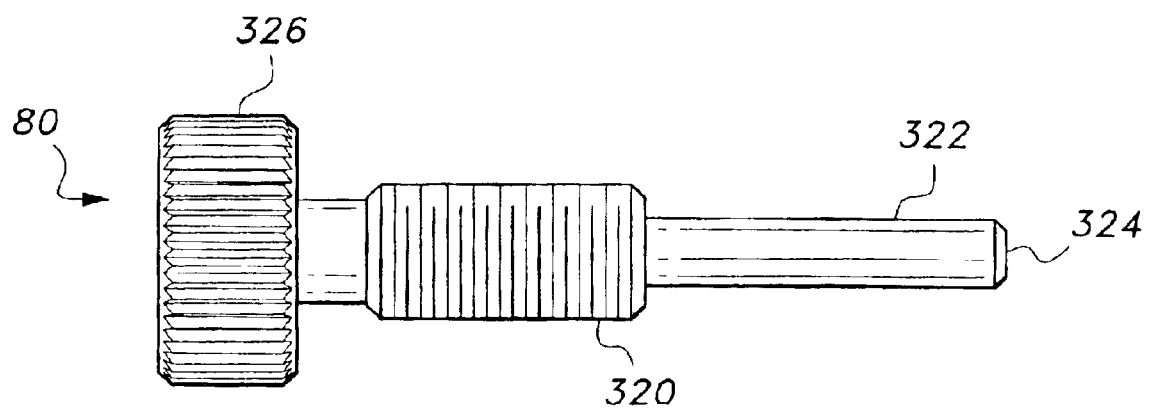
FIG. 20 is a side view of a plunger assembly that may be used with various assemblies of the present invention.

Arcuate positioning member 80 may be any suitable form of spring loaded retaining bolt or plunger assembly commonly available. One such device is Carr Lane P/N CL-4-HRP. As shown in FIG. 20, the plunger assembly 80 comprises an externally threaded barrel 320 containing a plunger shaft 322 that can reciprocate within the barrel 320. The plunger shaft 322 is normally advanced by a spring (not shown) within the barrel 320, so that the tip 324 of the shaft 322 engages one of the rail detents 42 to hold the bushing box 52 in a fixed position with respect to rail 40. The plunger shaft 322 can be withdrawn by pulling on knob 326 and locked in the retracted position by turning the knob 326. The bushing box 52 is then free to be moved to a new position along the rail at which another rail detent 42 is located, and is secured in place by releasing the plunger shaft 322 to engage the rail detent 42. Although the plunger 80 is illustrated as a means for locking the seat 90 in a position along the rail 40, other means for fixing the seat 90 may be employed. For example, a clamp pressing the sides of the neck 63 in the bushing 70 firmly against the sides of the keel 41 could be employed, or an electronically operated solenoid such as that shown in FIG. 24, as will be developed infra.

Figure 13:
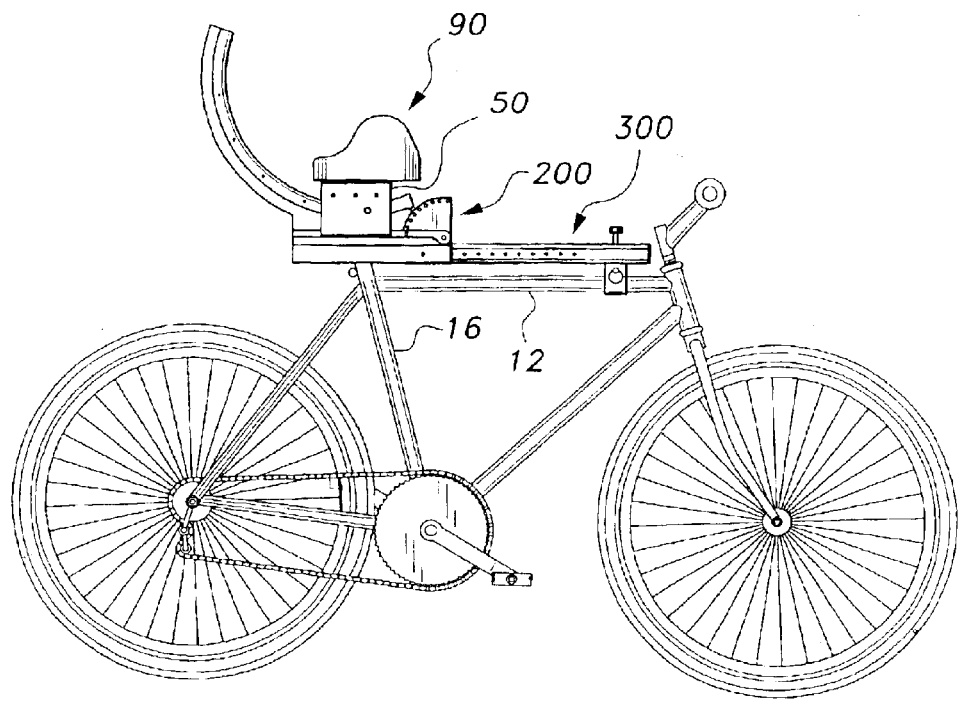
FIG. 13 shows a side elevational view of a bicycle equipped with another embodiment of a bicycle seat assembly of the invention.
Figure 15:
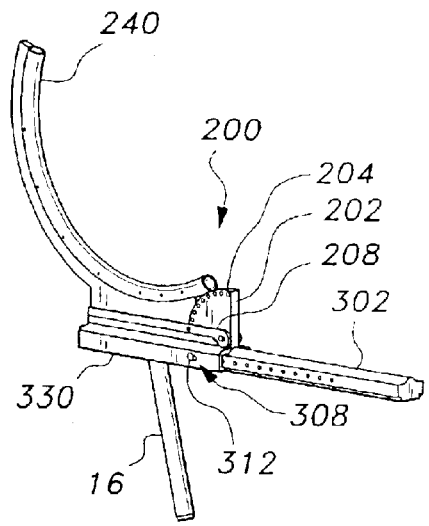
FIG. 15 is a perspective view of the rotation assembly and translation assembly of FIG. 14 mounted on a seat tube.
Figure 16:
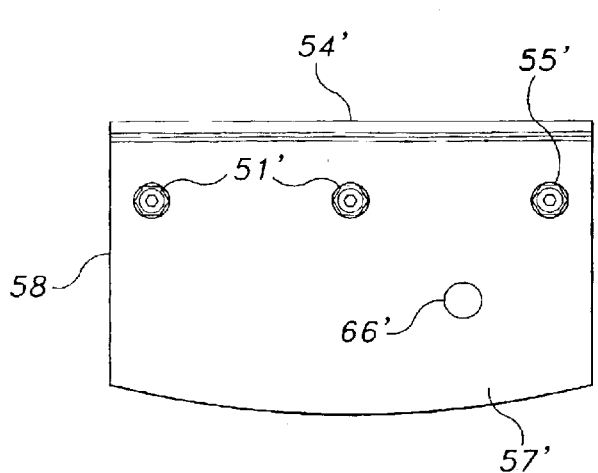
FIG. 16 is a side elevational view of a second embodiment of the seat mounting assembly.

Another embodiment of the invention is shown in FIGS. 13–15. In this embodiment a translation assembly 300 is provided to enable movement of the seat assembly longitudinally along the frame of the bicycle. Translation assembly 300 includes translation rail 302, which is secured to seat tube 16 in the rear and is secured to frame 12 in the front via support assembly 306. Translation rail 302 includes transition detents 304. A sliding base 330 is slidably mounted on translation rail 302. Sliding base 330 includes hole 310 (not shown) through which translation positioning member 308 is mounted. Translation positioning member 308 may be a spring loaded retention bolt or plunger assembly as discussed above or may be electromechanical as discussed infra. In operation therefore, when the rider pulls on knob 312 of translation positioning member 308, base 330 may slide along translation rail 302. When knob 312 is released, translation positioning member 308 will spring back into the next translation detent 304 that is encountered, and base 330 will now be secured in this new position.

Figure 21:
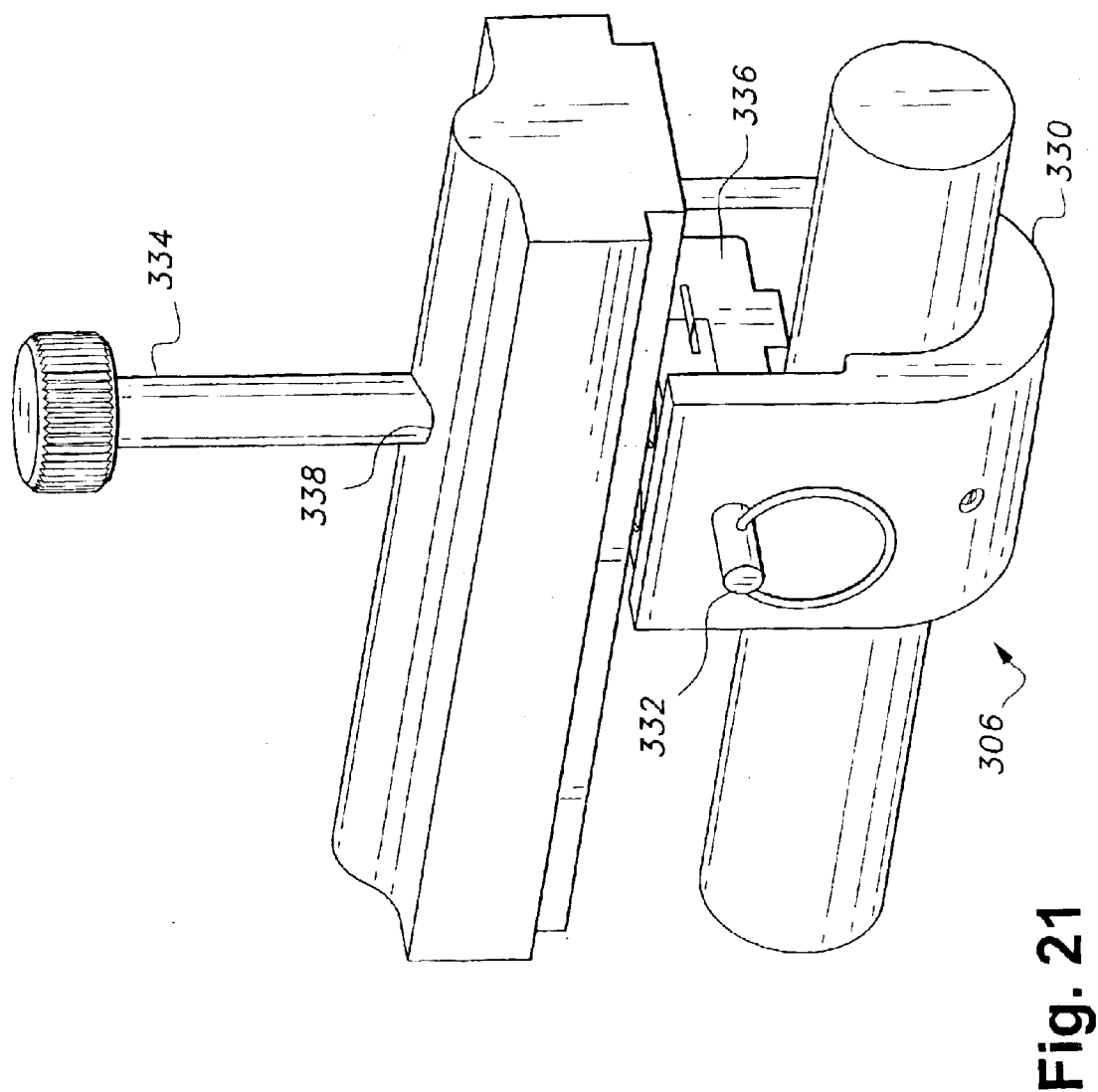
FIG. 21 is a perspective view of a translation rail support assembly used with an embodiment of the present invention.

Support assembly 306 will now be discussed in further detail. Support Assembly 306 is adjustable in height so that when the height of the seat assembly is adjusted via seat shaft 17, the translation assembly, and in particular, the translation rail 302, may be maintained level. As shown in FIG. 21, support assembly 306 generally comprises clamp 330, clamp pin 332, clamp screw 334, and block 336. Clamp screw 334 is a threaded jackscrew, a larger-diametered portion of which is screwed into in threaded hole 338 in translation rail 302. The smaller diametered portion of screw is secured in block 336 so that the bottom of block 336 together with clamp 330 securely holds top tube 12. Clamp pin 332 is used to securely hold block 336 and clamp 330 together. In order to raise translation rail 302, screw 334 is turned in a clockwise direction.

Also provided in this embodiment is a rotation assembly 200. Rotation assembly 200 includes central member 202. In this particular embodiment, central member 202 is in the form of a portion of a circle, although other forms may be used. Central member 202 includes rotation detents 204. Member 202 has an outer edge 206 which conforms to an inner edge 244 of arcuate keel and rail unit 240. The rotation assembly also includes lever 208 which extends along the bottom of unit 240 and is pivotally mounted in a hole 210 in member 202 via a bolt (not shown).

Lever 208 includes a hole 214 (not shown) to receive a rotation positioning member 212. Member 212 extends into one of the rotation detents 204. The rotation positioning member 212 may be a solenoid or a spring loaded retaining bolt or plunger assembly such as those discussed above. Member 212 includes knob 216. In operation, therefore, the rider may pull on knob 216 in order to release member 212 from one of the rotation detents 204. Lever 208 and unit 240 may then be rotated with respect to member 202. When knob 216 is released, rotation positioning member 212 will extend into the next detent 204 that is encountered, thus securing the rotation assembly 200 in a new position.

Figure 22:
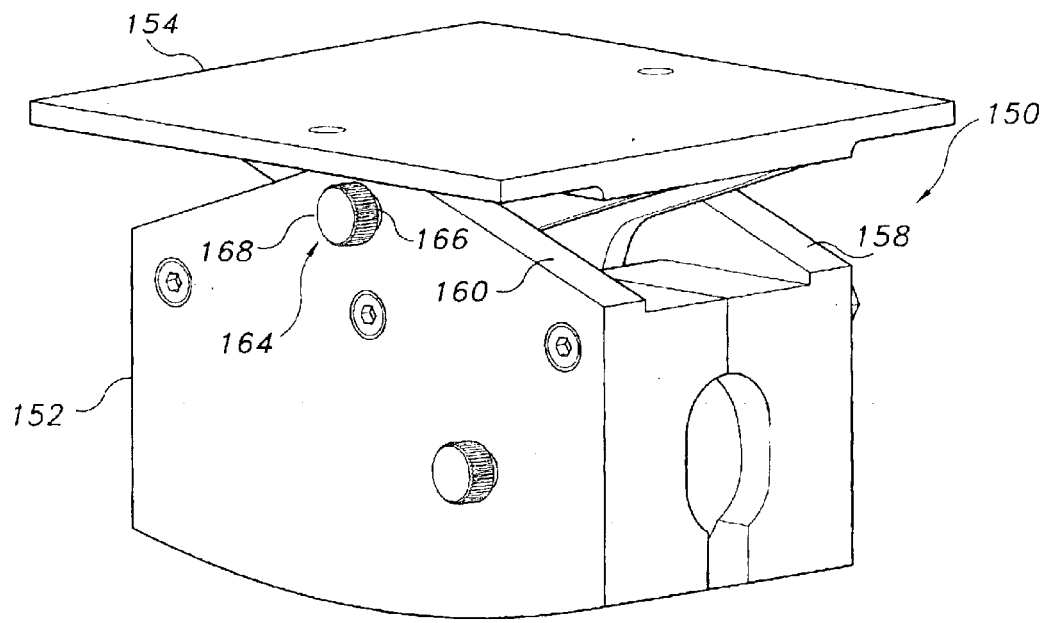
FIG. 22 is an isometric view of a tilt assembly used with an embodiment of the present invention.
Figure 23:
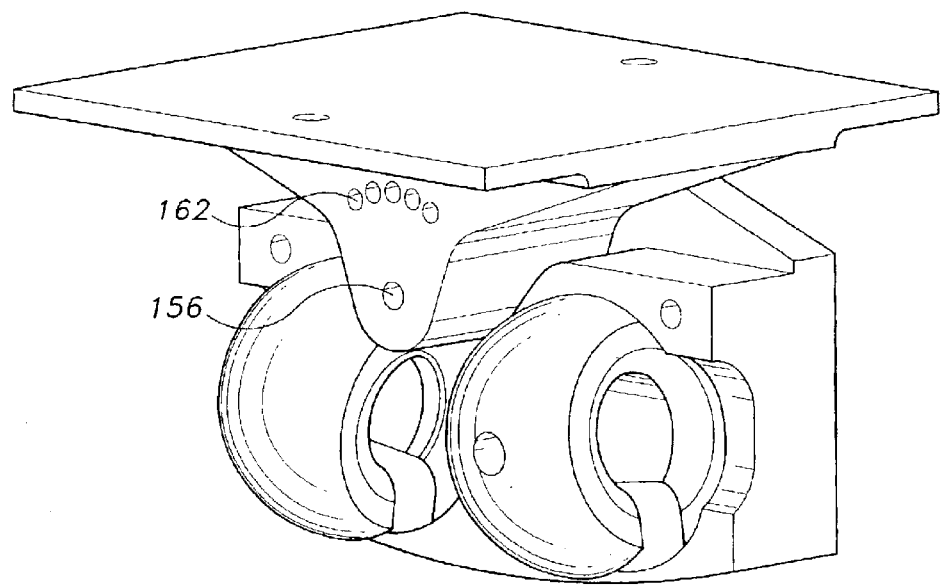
FIG. 23 is a cut-away view of the tilt assembly of FIG. 21.

An alternative seat mounting assembly includes a tilting assembly 150. As shown in FIGS. 22 and 23, bushing box 152 is attached to a platform 154 using a bolt through a pivoting center 156. Box 152 has sloped left and right edges 158 and 160, respectively. The underside of platform 154 includes tilt detents 162, and bushing box 152 also includes a hole 166 to accept a tilt positioning member 164. Tilt positioning member 164 may be a solenoid or a spring loaded retaining bolt or plunger assembly such as discussed above, including a knob 168. When the rider pulls on knob 168, tilt positioning member 164 is removed from tilt detent 162, and platform 154 may then rotate around an arc limited by left and right edges 158 and 160. When the rider releases knob 168, tilt positioning member 164 will extend into the one of tilt detents 162 that it next encounters, thus securing platform 154 in its new position.

Figure 24:
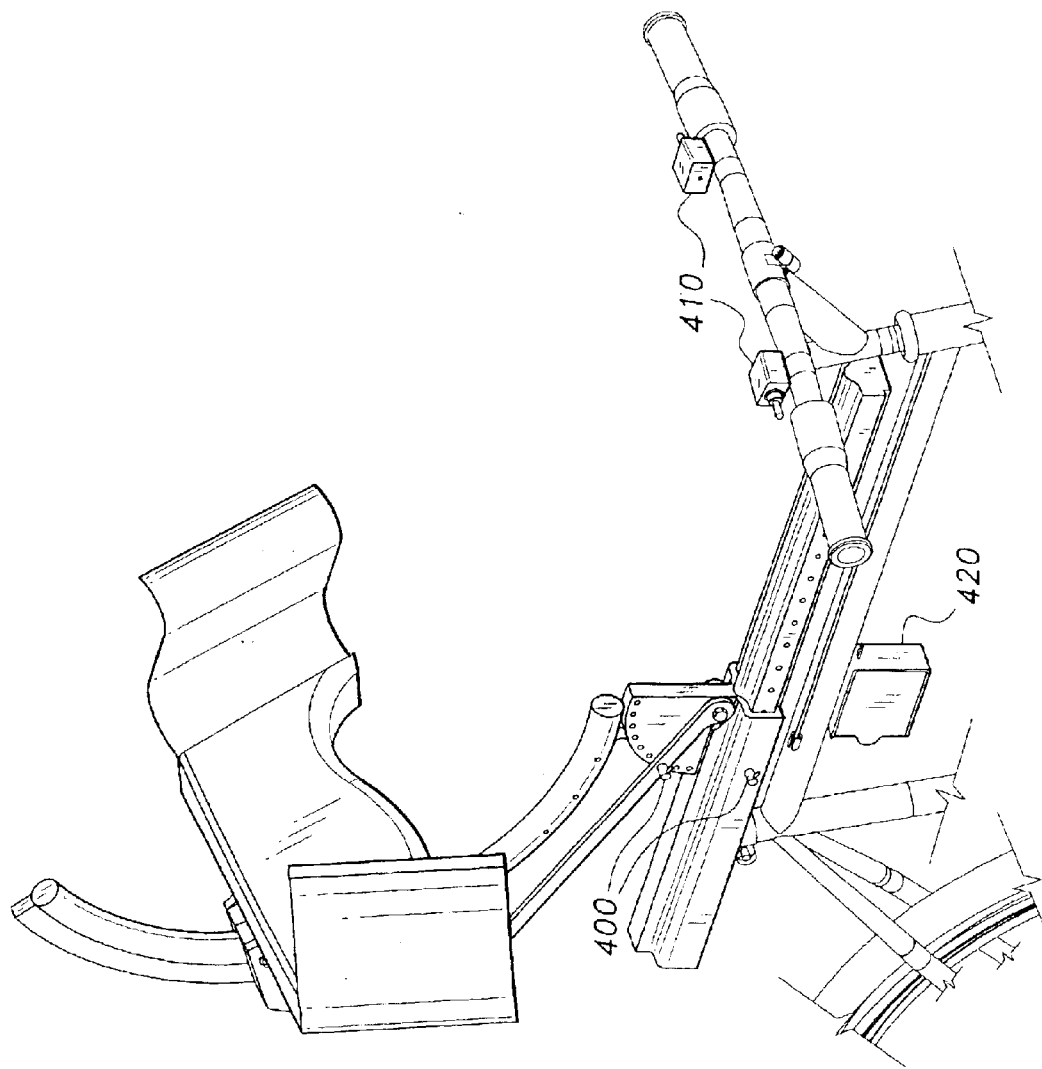
FIG. 24 is an isometric view of an embodiment of the present invention using solenoids.

Referring to FIG. 24, any or all of arcuate rail positioning member 80 (not shown), rotation positioning member 212, translation positioning member 308, and tilt positioning member 164 (not shown) may be replaced with electromechanical control members, such as solenoids 400. The solenoids may preferably be activated by double-throw, single-pull toggle switches 410, such as are commonly available, so that pressing and holding the toggle forward would release one positioning member, and pressing and holding the same toggle rearward would release a different positioning member. In this manner, four positioning members may be controlled by just two such switches. The switches may be located at any convenient location, such as on the handlebars of the bicycle. Alternatively, an easily accessible control panel may be provided. Power may be provided via a battery pack 420 which, in the particular embodiment shown, may be mounted under frame 12.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

I claim:

1. A seat for a bicycle comprising:
   a substantially rectangular member of unitary construction having a front, a rear, a first end and a second end opposite the first end, said member defining a generally concave rider support surface extending from the first end to the second end;
   a first side extending upwardly from the first end of said member and a second side extending upwardly from the second end of said member, each of said upwardly extending sides being angled outwardly from the rear to the front of said member and including an inwardly deflected top region for grasping a rider's hips; and
   means for securing said member to a seat mounting assembly.

2. The seat according to claim 1, wherein said generally concave rider support surface has a radius of curvature of about 40 inches.

3. The seat according to claim 1, wherein said generally concave rider support surface includes two generally concave regions for further accommodating a rider's buttocks.

4. The seat according to claim 1, wherein said securing means includes one or more bolts.

* * * * *